United States Patent
Mamrak et al.

(10) Patent No.: US 12,472,556 B2
(45) Date of Patent: Nov. 18, 2025

(54) APPARATUS AND METHOD FOR ANGULAR AND ROTATIONAL ADDITIVE MANUFACTURING

(71) Applicant: General Electric Company, Schenectady, NY (US)

(72) Inventors: Justin Mamrak, Loveland, OH (US); MacKenzie Ryan Redding, Mason, OH (US)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 18/679,528

(22) Filed: May 31, 2024

(65) Prior Publication Data

US 2024/0307959 A1    Sep. 19, 2024

Related U.S. Application Data

(62) Division of application No. 16/761,691, filed as application No. PCT/US2018/058823 on Nov. 2, 2018, now Pat. No. 12,023,739.

(Continued)

(51) Int. Cl.
| | |
|---|---|
| B22F 5/00 | (2006.01) |
| B22F 10/14 | (2021.01) |
| B22F 10/28 | (2021.01) |
| B22F 10/47 | (2021.01) |
| B22F 12/00 | (2021.01) |
| B22F 12/37 | (2021.01) |
| B22F 12/67 | (2021.01) |
| B23K 26/08 | (2014.01) |
| B23K 26/082 | (2014.01) |
| B23K 26/14 | (2014.01) |

(Continued)

(52) U.S. Cl.
CPC ............ *B22F 5/009* (2013.01); *B22F 10/28* (2021.01); *B22F 10/47* (2021.01); *B22F 12/37* (2021.01); *B23K 26/082* (2015.10); *B23K 26/0823* (2013.01); *B23K 26/1464* (2013.01); *B23K 26/342* (2015.10); *B33Y 10/00* (2014.12); *B33Y 30/00* (2014.12); *B33Y 40/00* (2014.12); *B22F 10/14* (2021.01); *B22F 12/226* (2021.01); *B22F 12/67* (2021.01)

(58) Field of Classification Search
CPC ......... B33Y 10/00; B33Y 30/00; B33Y 40/00; B23K 26/082; B23K 26/342; B23K 26/0823; B23K 26/1464
USPC .......................................... 219/76
See application file for complete search history.

(56) References Cited

U.S. PATENT DOCUMENTS

| | | |
|---|---|---|
| 8,021,138 B2 | 9/2011 | Green |
| 9,321,215 B2 | 4/2016 | Dudley |

(Continued)

FOREIGN PATENT DOCUMENTS

| | | |
|---|---|---|
| DE | 102015001480 A1 | 8/2016 |
| DE | 102016111047 B3 | 10/2017 |
| GB | 2543305 A | 4/2017 |

*Primary Examiner* — Steven W Crabb
*Assistant Examiner* — Dilnessa B Belay
(74) *Attorney, Agent, or Firm* — Dority & Manning, P.A.

(57) ABSTRACT

An additive manufacturing apparatus is provided and may include at least one build unit; a build platform; and at least one collector positioned on the apparatus such that the at least one collector contacts an outer surface of a build wall as the build wall is formed during a build. Methods are also provided for manufacturing at least one object.

9 Claims, 7 Drawing Sheets

Related U.S. Application Data

(60) Provisional application No. 62/584,169, filed on Nov. 10, 2017.

(51) Int. Cl.
  *B23K 26/342* (2014.01)
  *B33Y 10/00* (2015.01)
  *B33Y 30/00* (2015.01)
  *B33Y 40/00* (2020.01)

(56) References Cited

U.S. PATENT DOCUMENTS

| | | | |
|---|---|---|---|
| 9,776,362 B2 | 10/2017 | Chuang et al. | |
| 2011/0297081 A1* | 12/2011 | Green | B33Y 30/00 |
| | | | 118/107 |
| 2013/0197683 A1* | 8/2013 | Zhang | B22F 10/66 |
| | | | 700/96 |
| 2013/0234355 A1* | 9/2013 | Hartmann | B22F 10/00 |
| | | | 425/375 |
| 2015/0306819 A1 | 10/2015 | Ljungblad | |
| 2016/0001401 A1 | 1/2016 | Dimter et al. | |
| 2016/0114432 A1 | 4/2016 | Ferrar et al. | |
| 2016/0193695 A1 | 7/2016 | Haynes | |
| 2017/0113242 A1 | 4/2017 | Giulietti et al. | |
| 2017/0232680 A1 | 8/2017 | Skogsrud et al. | |
| 2018/0345373 A1 | 12/2018 | Holford et al. | |
| 2021/0046703 A1 | 2/2021 | Hoppe et al. | |

* cited by examiner

APPARATUS AND METHOD FOR ANGULAR AND ROTATIONAL ADDITIVE MANUFACTURING

PRIORITY INFORMATION

The present application claims priority to U.S. Provisional Application Ser. No. 62/584,169 filed on Nov. 10, 2017, PCT Application No. PCT/US2018/058823 filed on Nov. 2, 2018, and U.S. application Ser. No. 16/761,691 filed on May 5, 2020, which are incorporated by reference herein in their entirety.

FIELD OF TECHNOLOGY

The present disclosure generally relates to methods and systems adapted to perform additive manufacturing ("AM") processes, for example by direct melt laser manufacturing ("DMLM"), on a larger scale format.

BACKGROUND

Additive manufacturing ("AM") processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering ("DMLS") or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

In conventional systems, the walls of the powder bed define the amount of powder needed to make a part. However, the size of object to be built is limited by the size of the machine's powder bed. Increasing the size of the powder bed has limits due to the needed large angle of incidence that can lower scan quality, and weight of the powder bed which can exceed the capabilities of steppers used to lower the build platform. In view of the foregoing, there remains a need for manufacturing apparatuses and methods that can handle production of large objects with improved precision and in a manner that is both time- and cost-efficient with a minimal waste of raw materials.

BRIEF DESCRIPTION

Aspects and advantages will be set forth in part in the following description, or may be obvious from the description, or may be learned through practice of the invention.

An additive manufacturing apparatus is generally provided. In one embodiment, the additive manufacturing apparatus includes at least one build unit; a build platform (e.g., a rotating build platform); and at least one collector positioned on the apparatus such that the at least one collector contacts an outer surface of a build wall as the build wall is formed during a build.

Methods are also generally provided for manufacturing at least one object. In one embodiment, the method may include: (a) rotating a build platform; (b) depositing powder from at least one build unit; (c) bonding at least one selected portion of the powder to form an outer build envelope and an inner build envelope; (d) positioning an outer collector on an external surface of the outer build envelope and positioning an inner collector on an external surface of the inner build envelope; and (e) repeating at least steps (b) through (d) to form the object between the outer build envelope and the inner build envelope. The build unit may be moved in a radial direction during the manufacture of the at least one object.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
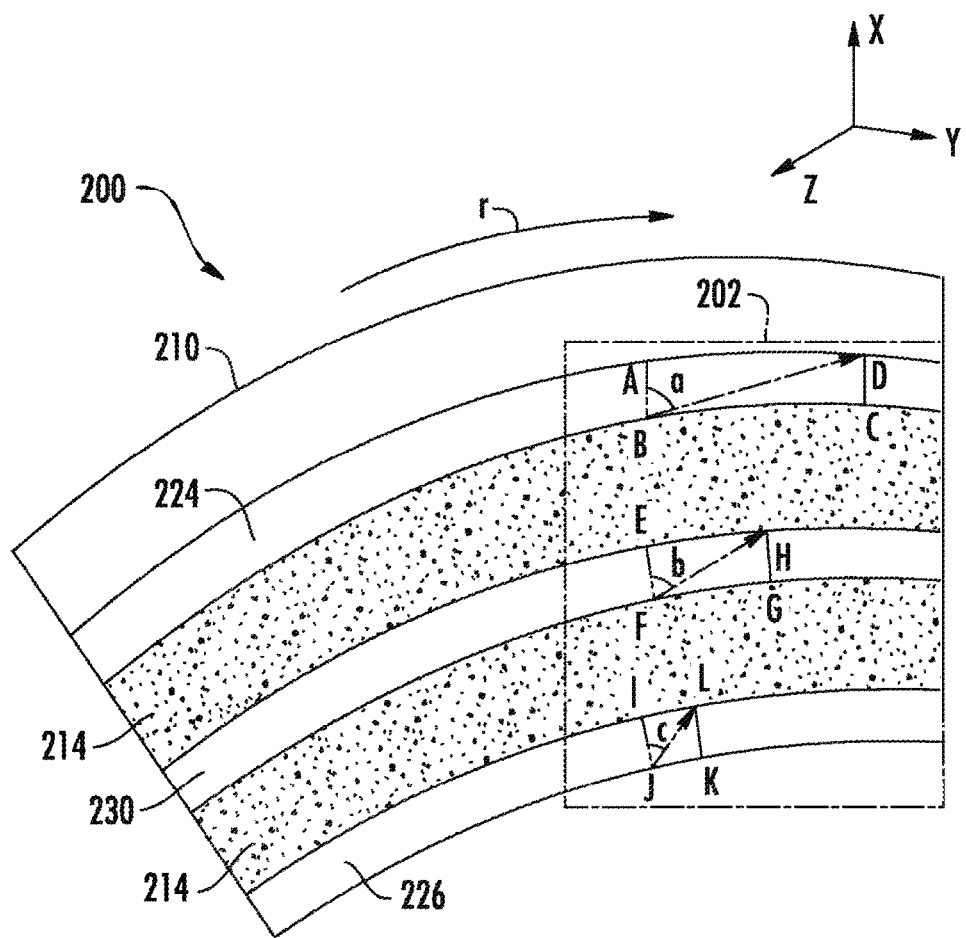
FIG. 1 is a top view showing an additive manufacturing print strategy in accordance with an embodiment of the invention.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

Methods and apparatus are generally provided for additively manufacturing certain components of metal objects. In particular embodiments, methods and apparatus can be used to perform powder-based additive layer manufacturing of a large object, particularly large, annular components (e.g., annular components of turbomachinery). Examples of powder-based additive layer manufacturing include but are not limited to selective laser sintering (SLS), selective laser melting (SLM), direct metal laser sintering (DMLS), direct metal laser melting (DMLM), binder jetting, and electron beam melting (EBM) processes.

In one embodiment, the additive manufacturing apparatus provided herein includes a mobile build unit assembly, which is configured to include several components that are essential for additively manufacturing high-precision, large-scale objects. These build components include, for example, a powder recoating mechanism and a bonding mechanism (e.g., an irradiation beam directing mechanism, a binder jetting apparatus, etc.). The build unit is advantageously attached to a positioning mechanism that allows two- or three-dimensional movement (along x-, y- and z-axes) throughout the build environment, as well as rotation of the build unit in a way that allows leveling of the powder in any direction desired. The positioning mechanism may be a gantry, a delta robot, a cable robot, a robotic arm, a belt drive, or the like.

Aside from the mobile build unit, one embodiment of the additive manufacturing apparatus also includes a rotating build platform. Preferably, this build platform has a substantially circular configuration, but is not so limited. Since the build unit of the apparatus is mobile, this eliminates the need to lower the build platform as successive layers of powder are built up, as it is in conventional powder bed systems. Accordingly, the rotating platform of the present invention is preferably vertically stationary. However, in other embodiments, the build platform may be stationary while the build unit is movable.

Since there are two mobile components in the additive manufacturing apparatuses of particular embodiments of the present invention, namely the build unit and the build platform, it is important to coordinate, for example, the speed and/or direction of the irradiation beam directing mechanism with, for example, the rotational speed and/or rotational direction of the build platform. FIG. 1 shows a top view of the apparatus 200 having a mobile build unit 202 and a rotating build platform 210. The rotational direction of the build platform 210 is shown with reference to the curved arrow "r". The build unit 202, which includes an irradiation beam directing mechanism (not shown), may be translated along the x-, y- or z-axis as indicated by the linear arrows. FIG. 1 also shows a built object 230 that is formed in a powder bed 214, between an outer grown build envelope 224 and, in many cases, an inner build envelope 226. The inner grown build envelope 226 may be grown along with the outer grown build object 234 while the object 230 is grown within a powder bed 214 between the inner and outer grown build envelopes 226, 234.

The dashed lines AB, EF and IJ represent imaginary co-linear fused layers on respectively the outer grown build envelope 224, built object 230 and inner grown build envelope 226 if the build platform 210 was non-rotating; whereas the solid lines CD, GH and KL represent that actual and corresponding co-linear fused layers formed. FIG. 1 shows the irradiation directions of the irradiation beam directing mechanism, as indicated by the dashed arrows BD, FH and JL. In order to produce the co-linear fused layers CD (on the outer grown build envelope 224), GH (built object 230) and KL (inner grown build envelope 206), the irradiation beam directing mechanism irradiates at the directions indicated with the arrows BD, FH and JL, respectively, where the angles a>b>c. The irradiation directions 206A, 206B and 206C are designed to offset or compensate for the rotational movement of the build platform 210 in the direction of "r".

The compensation scheme generally takes account of the fact that the angular velocity is constant but the surface velocity of the powder bed increases in the direction away from the center of rotation. Compensation may also cause the beam to slow when writing in the direction of rotation and speed up when writing against the direction of travel. It should be appreciated that alternative or additional schemes may be utilized to compensate for the rotational movement of the build platform 210.

Figure 2:
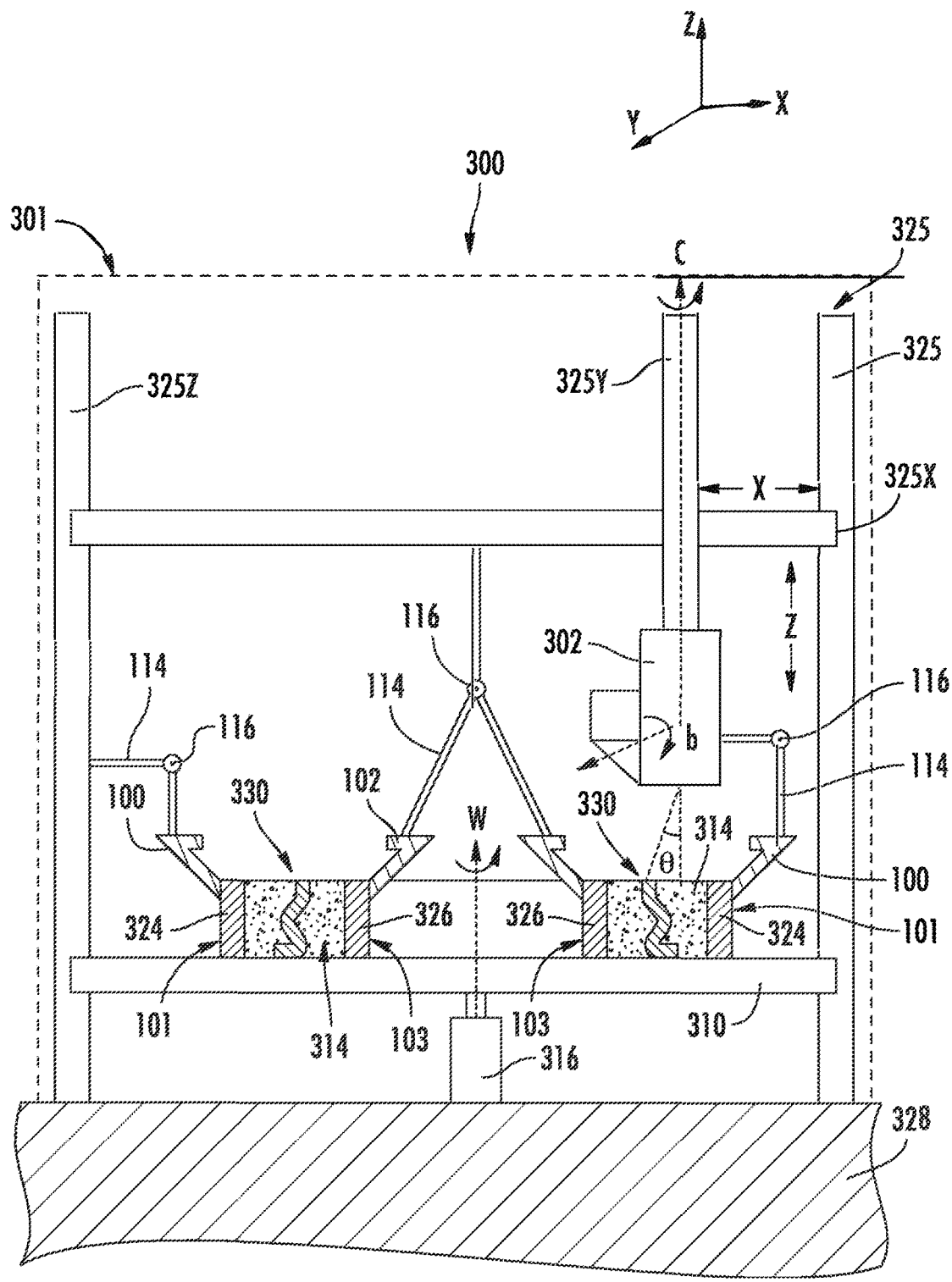
FIG. 2 is a schematic diagram showing a front view showing a cross section of an additive manufacturing apparatus according an embodiment of the invention.

FIG. 2 depicts a schematic representation of an additive manufacturing apparatus 300 according to one embodiment of the present invention. The apparatus 300 may include a build enclosure 301 housing the entire apparatus 300 and object 330 to be built. The apparatus 300 includes a build unit 302 and a rotating build platform 310. During operation, the apparatus builds an object 330 in a powder bed 314 formed between an outer grown build envelope 324 and, in many cases, an inner build envelope 326. Preferably, the object 330 is a large annular object, such as, but not limited to, a turbine or vane shrouding, a central engine shaft, a casing, a compressor liner, a combustor liner, a duct, etc.

Figure 4:
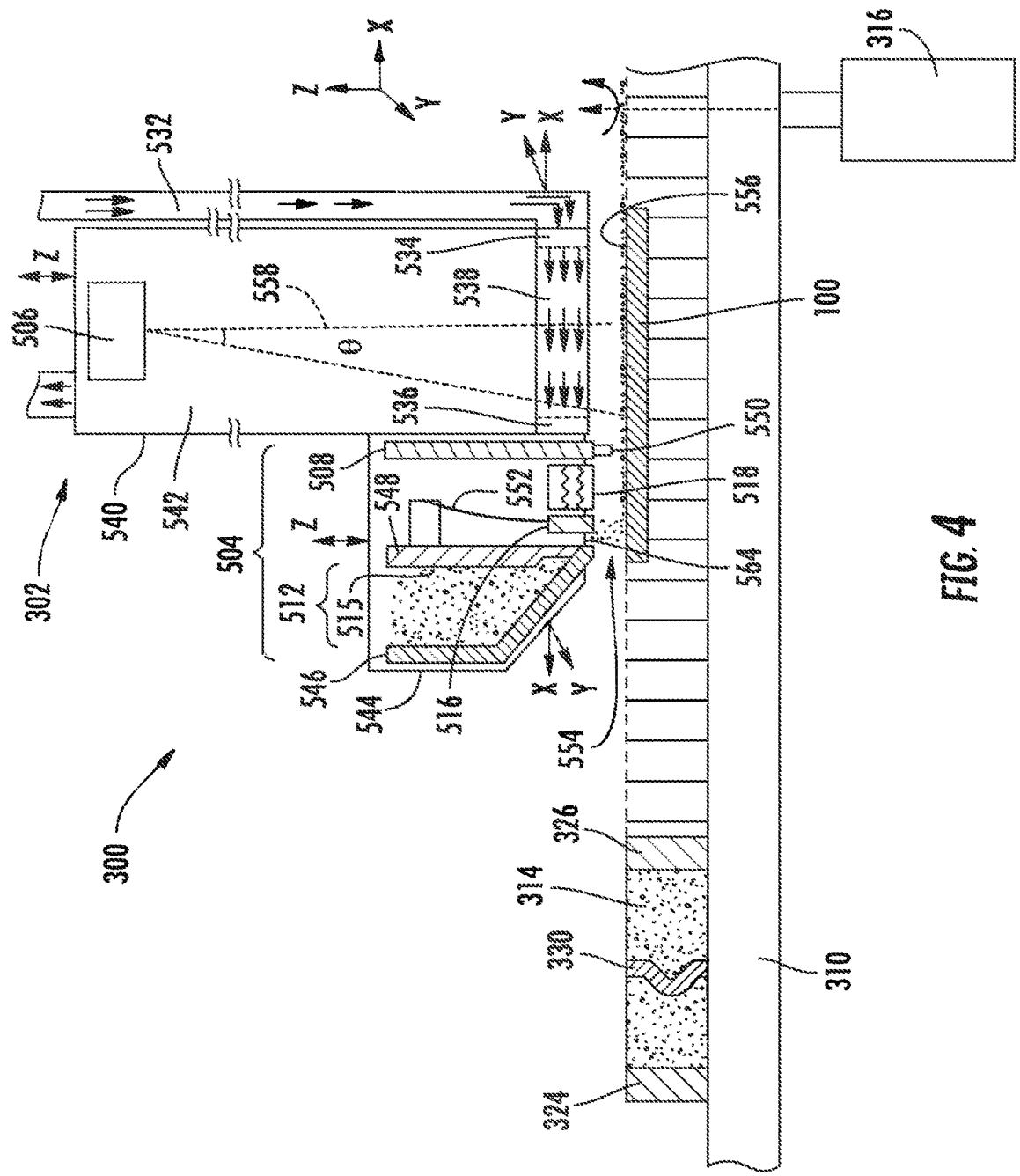
FIG. 4 is an expanded cross section of a build unit and part of the rotating build platform of the additive manufacturing apparatus of FIG. 3.
Figure 5:
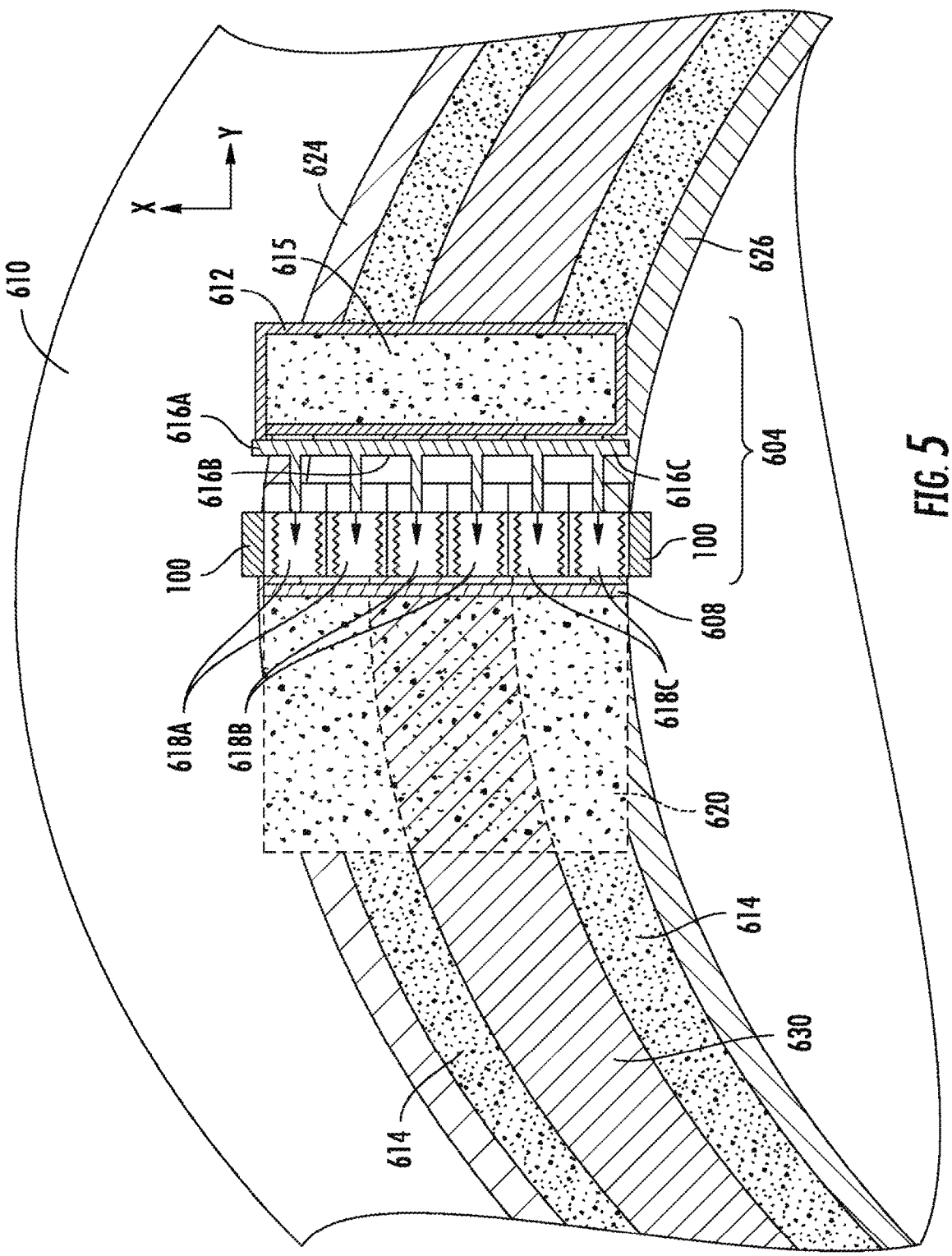
FIG. 5 is a top view of an additive manufacturing apparatus having a selective recoating mechanism according to an embodiment of the invention.

The build unit 302 may be configured to include several components for additively manufacturing a high-precision, large-scale object or multiple smaller objects. A mobile build unit may include, for example, a powder delivery mechanism, a powder recoating mechanism, a gas-flow mechanism with a gas-flow zone and an irradiation beam directing mechanism. FIGS. 4 and 5 include additional details of an exemplary mobile build unit to be used in accordance with the present invention.

The positioning mechanism 325 may be an X-Y-Z gantry has one or more x-crossbeams 325X (one shown in FIG. 2) that independently move the build unit 302 along the x-axis (i.e. left or right), one or more y-crossbeams 325Y (one shown in FIG. 2) that respectively move the build unit 302 along the y-axis (i.e. inward or outward). Such two-dimensional movements across the x-y plane are substantially parallel to the build platform 206 or a build area therewithin. Additionally, the positioning mechanism 325 has one or more z-crossbeams 325Z (two shown in FIG. 2) that moves the build unit 302 along the z-axis (i.e. upward and downward or substantially perpendicular to the build platform 310 or a build area therewithin). The positioning mechanism 325 is further operable to rotate the build unit 302 around the c-axis and also the b-axis.

The rotating build platform 310 may be a rigid and ring-shaped or annular structure (i.e. with an inner central hole) configured to rotate 360° around the center of rotation W. The rotating build platform 310 may be secured to an end mount of a motor 316 that is operable to selectively rotate the rotating build platform 310 around the center of rotation W such that the build platform 310 moves in a circular path. The motor 316 may be further secured to a stationary support structure 328. The motor may also be located elsewhere near the apparatus and mechanically connected with the build platform via a belt for translating motion of the motor to the build platform.

In the embodiment of FIG. 2, outer collectors 100 and inner collectors 102 are positioned to remain adjacent to the outer grown build envelope 324 and the inner build envelope 326, respectively. Generally, the outer collectors 100 and inner collectors 102 temporarily trap powder along the outside of the outer wall 324 and the inner wall 236, respectively. While the powder is trapped by the collectors 100, 102, the energy source is used to melt the powder forming the walls 324, 326, such that the walls 324, 326 are formed with powder is on either side. As such, the collectors 100, 102 may inhibit the walls 324, 326 from having a break down effect sometimes observed without powder on both sides. The excess powder on the exterior of the walls 324, 326 may then fall away to the outside of the part and be collected at a later time. Alternatively, a trailing vacuum could travel with head for immediate collection.

Figure 7:
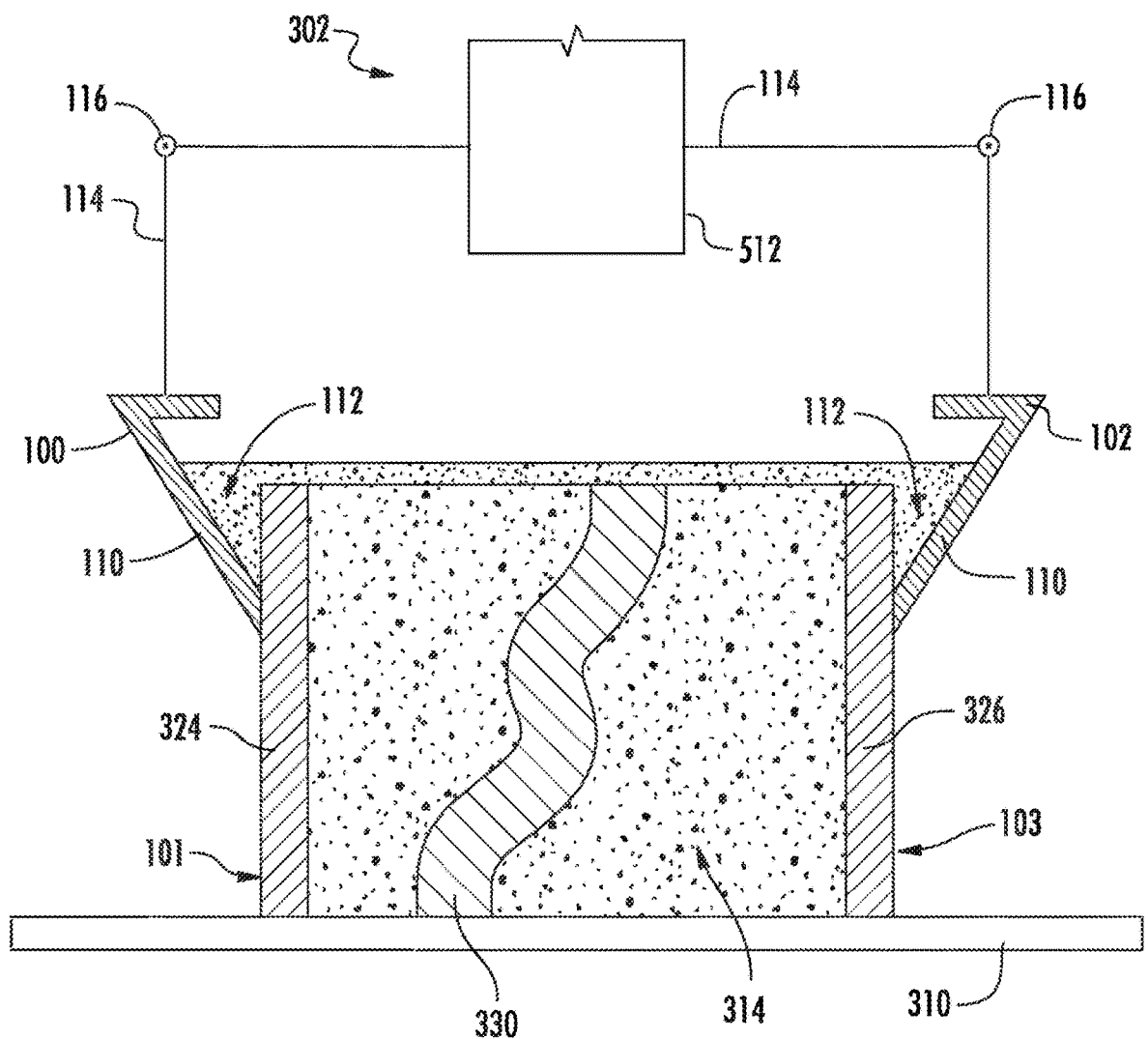
FIG. 7 shows an exemplary cross-sectional view of a build unit during an object build between a pair of build walls over a build platform.

Referring to FIG. 7, one embodiment of the outer collectors 100 and inner collectors 102 are shown positioned adjacent to the exterior surfaces 101, 103 of the outer grown build envelope 324 and the inner build envelope 326, respectively. Each collector 100, 102 includes a collection arm 110 contacting the outer surface 101, 103 to form a powder cavity 112 therebetween.

In particular embodiments, the outer collectors 100 and inner collectors 102 are pivotally attached to the build unit 302 (e.g., to the powder dispenser 512). For example, support members 114 may connect the outer collectors 100 and inner collectors 102 to the build unit 302. The support members 114 may also include a pivot joint 116 configured to maintain contact between the outer collectors 100 and inner collectors 102 and the exterior surfaces 101, 103 of the outer grown build envelope 324 and the inner build envelope 326, respectively. The pivot joints 116 may allow for the collectors 100, 102 to be biased toward the build envelopes 324, 326 such that contact is kept therebetween, even as the build unit 302 is moved about the apparatus. For example, the pivot joint can be controlled with the movement of the build unit 302. In other embodiments, support members 114 may be attached to the positioning mechanism 325 (e.g., the z-crossbeams 325Z or the x-crossbeams 325X, as shown in FIG. 2, etc.).

Figure 3:
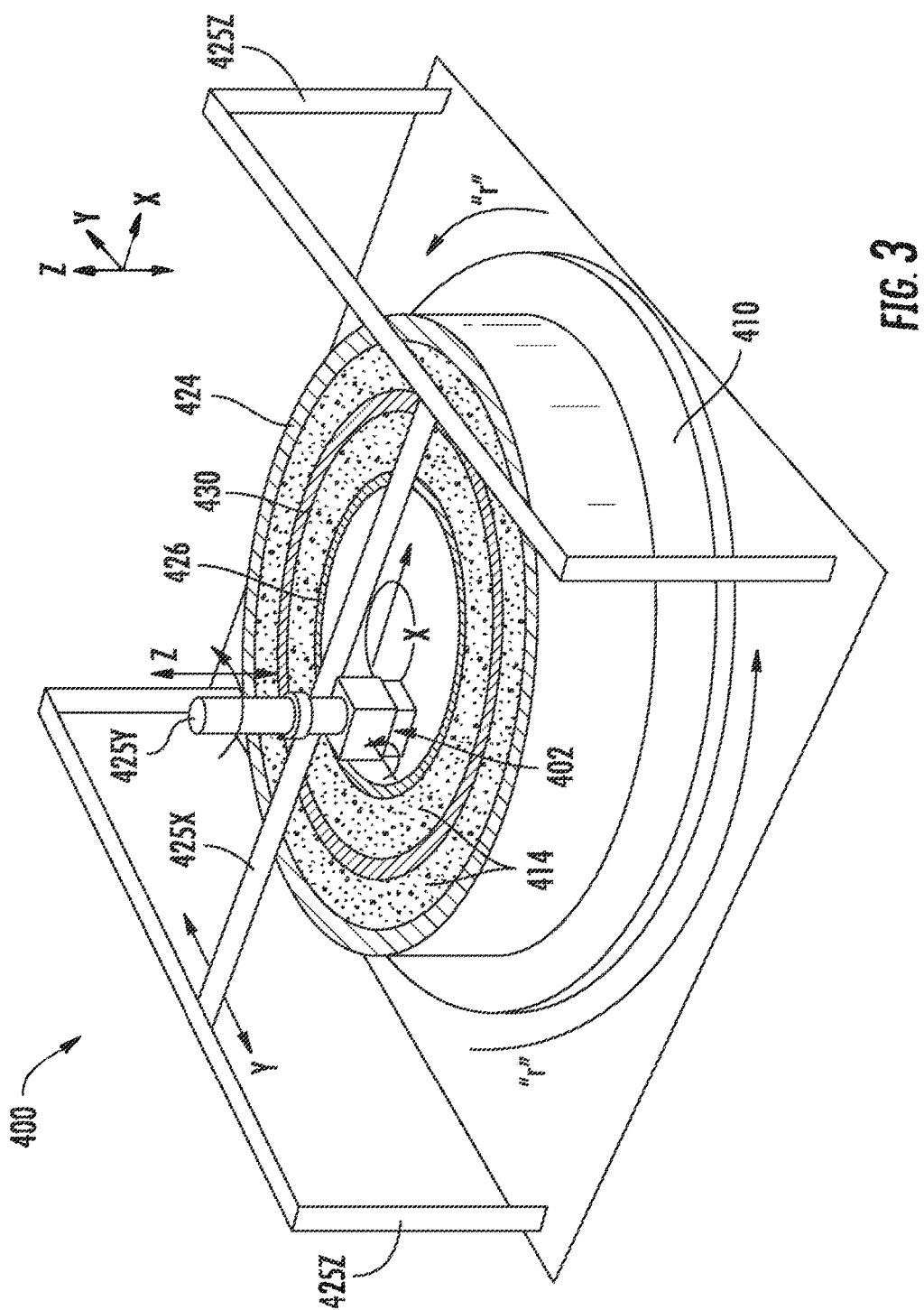
FIG. 3 is a perspective view of an additive manufacturing apparatus in accordance with an embodiment of the invention.

FIG. 3 shows an additive manufacturing apparatus 400 in accordance with another aspect of the present invention. The build unit 402 is attached to a gantry having "z" crossbeams 425Y, "x" crossbeam 425X and "y" crossbeam 425Y (partially shown). The build unit 402 can be rotated in the x-y plane as well as the z-plane as shown by the curved arrows in FIG. 3. The object being built 430 on the rotating build platform 410 is shown in a powder bed 414 constrained by an outer build wall 424 and an inner build wall 426. The rotating build platform 410 may be further secured to a stationary support structure 428.

FIG. 4 shows a side view of a manufacturing apparatus 300 including details of the build unit 302, which is pictured on the far side of the build platform. The mobile build unit 302 includes an irradiation beam directing mechanism 506, a gas-flow mechanism 532 with a gas inlet 534 and gas outlet 536 providing gas flow to a gas flow zone 538, and a powder recoating mechanism 504. Above the gas flow zone 538, there is an enclosure 540 that contains an inert environment 542. The powder recoating mechanism 504, which is mounted on a recoater plate 544, has a powder dispenser 512 that includes a back plate 546 and a front plate 548. The powder recoating mechanism 504 also includes at least one actuating element 552, at least one gate plate 516, a recoater blade 550, an actuator 518 and a recoater arm 508. In this embodiment, the actuator 518 activates the actuating element 552 to pull the gate plate 516 away from the front plate 548, as shown in FIG. 4. There is also a gap 564 between the front plate 548 and the gate plate 516 that allows the powder to flow onto the rotating build platform 310 when the gate plate 516 is pulled away from the front plate 548 by the actuating element 552.

FIG. 4 shows the build unit 302 with the gate plate 516 at an open position. The powder 515 in the powder dispenser 512 is deposited to make a fresh layer of powder 554, which is smoothed over a portion of the top surface (i.e. build or work surface) of the rotating build platform 310 by the recoater blade 510 to make a substantially even powder layer 556 which is then irradiated by the irradiation beam 558 to a fused layer that is part of the printed object 330. In some embodiments, the substantially even powder layer 556 may be irradiated at the same time as the build unit 302 is moving, which allows for a continuous operation of the build unit 302 and hence, a more time-efficient production of the printed or grown object 330. The object being built 330 on the rotating build platform 310 is shown in a powder bed 314 constrained by an outer build wall 324 and an inner build wall 326.

FIG. 5 shows a top view of a selective powder recoating mechanism 604 and a portion of the corresponding rotating build platform 610 according to an embodiment of the invention. The selective powder recoating mechanism 604 has a powder dispenser 612 with only a single compartment containing a raw material powder 615, though multiple compartments containing multiple different material powders are also possible. There are gate plates that are each independently controlled by the actuators 618A, 618B, 618C. FIG. 5 shows all of the gate plates 616A, 616B, 616C being held in an open position to dispense powder 615 into the build area 620, and the deposited powder is then smoothed out or leveled by the recoater blade (not shown in this view). The selective powder recoating mechanism 604 also may have a recoater arm 608. In this particular embodiment, the rotating build platform 610 is shown as having an outer build wall 624 and an inner build wall 626.

Advantageously, a selective recoating mechanism according to an embodiment of the present invention allows precise control of powder deposition using powder deposition device (e.g. a hopper) with independently controllable powder gate plates as illustrated, for example, in FIG. 5 (gate plates 616A, 616B and 616C). The powder gate plates are controlled by at least one actuating element which may be, for instance, a bi-directional valve or a spring. Each powder gate can be opened and closed for particular periods of time, in particular patterns, to finely control the location and quantity of powder deposition. The powder dispenser 612 may contain dividing walls so that it contains multiple chambers, each chamber corresponding to a powder gate, and each chamber containing a particular powder material. The powder materials in the separate chambers may be the same, or they may be different. Advantageously, each powder gate can be made relatively small so that control over the powder deposition is as fine as possible. Each powder gate has a width that may be, for example, no greater than about 2 inches (in), or more preferably no greater than about ¼ in. In general, the smaller the powder gate, the greater the powder deposition resolution, and there is no particular lower limit on the width of the powder gate. The sum of the widths of all powder gates may be smaller than the largest width of the object, and there is no particular upper limit on the width of the object relative to the sum of the widths of the power gates. Advantageously, a simple on/off powder gate mechanism according to an embodiment of the present invention is simpler and thus less prone to malfunctioning. It also advantageously permits the powder to come into contact with fewer parts, which reduces the possibility of contamination.

Figure 6:
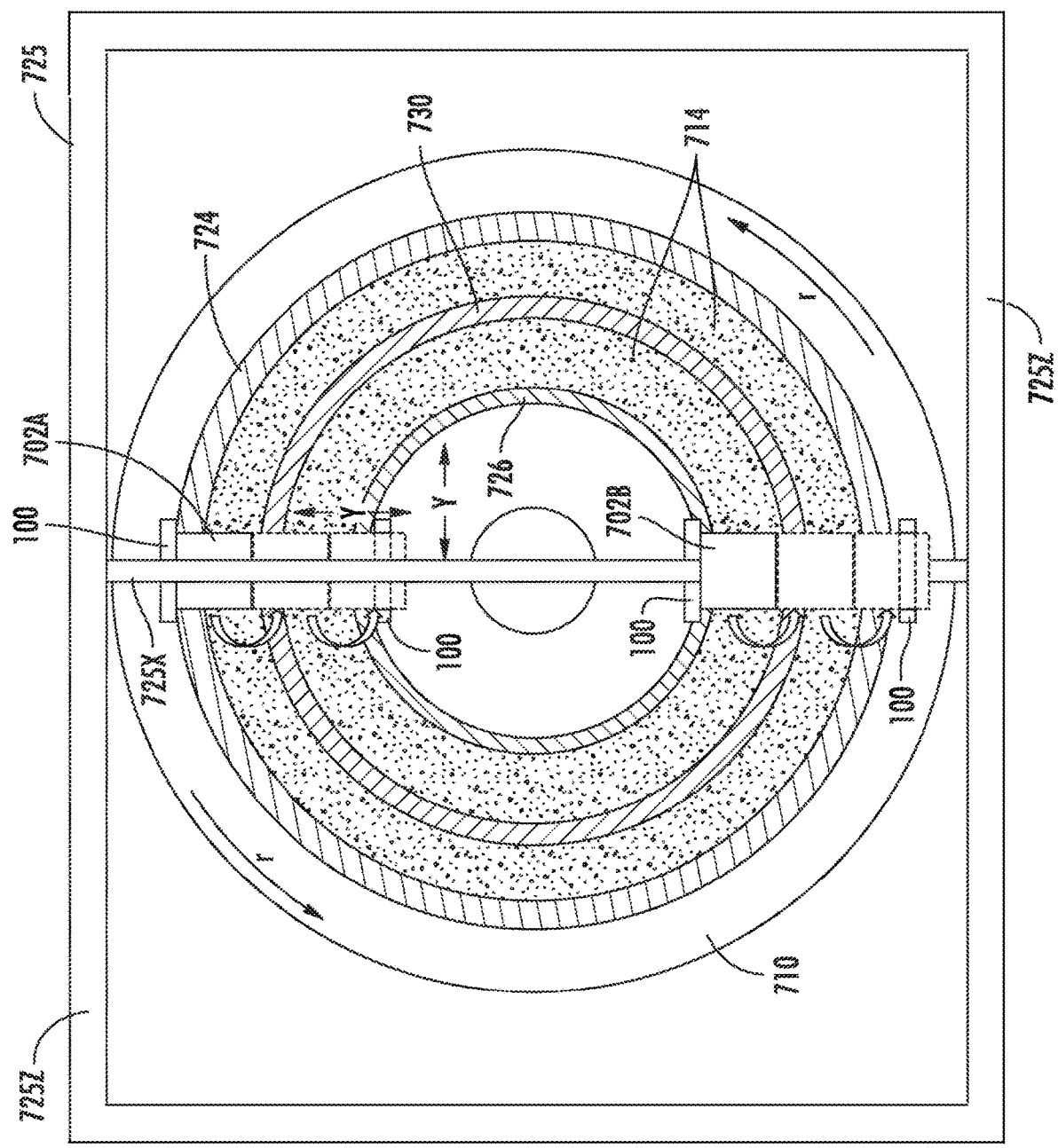
FIG. 6 is a top view of an additive manufacturing apparatus according to an embodiment of the invention that has two build units.

FIG. 6 shows a top down view of an additive manufacturing apparatus 700 having two build units 702A and 702B mounted on the positioning mechanism 725. The positioning mechanism 725 as shown in FIG. 6 has an "x" crossbeam 725X and two "z" crossbeams 725Z. The rotational direction of the build platform 710 is shown with reference to curved arrows "r". The build units 702A and 702B may be translated along the "x" axis as shown by the dashed boxes indicating movement along different radial positions along x-crossbeam 725X. In one aspect, the build unit may be moved along the "x" axis while held in a fixed position intersecting the center of the circular build platform 710. In this way, the rotational movement of the build platform allows the build unit 702 to operate along a circular build path as the build platform 710 and object 730 rotate beneath. In some cases movement along the "y" axis may be desirable as well. For example, in one case movement along the "x" and "y" axes are used to build portions of the object 730 while the build platform 710 is prevented from rotation. FIG. 6 also shows the built object 730 that is formed in a powder bed 714, between an outer grown build envelope 724 and an inner build envelope 726.

Representative examples of suitable powder materials can include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-750, ECY 768, 282, X45, PWA 1483 and CMSX (e.g. CMSX-4) single crystal alloys. The manufactured objects of the present invention may be formed with one or more selected crystalline microstructures, such as directionally solidified ("DS") or single-crystal ("SX").

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of manufacturing at least one object, the method comprising:
 (a) rotating a build platform;
 (b) depositing powder from at least one build unit;
 (c) bonding at least one selected portion of the powder to form an outer build envelope and an inner build envelope;
 (d) positioning a first end of an outer collector on an external surface of a first build wall defining the outer build envelope and positioning a first end of an inner collector on an external surface of a second build wall of the inner build envelope, wherein the first build wall and the second build wall at least partially defines a powder bed, wherein the first end of the outer collector and the first end of the inner collector are in contact and extend from the external surface of the first build wall and the external surface of the second build wall, respectively, to form a powder cavity;
 (e) trapping a portion of the powder temporarily in the powder cavity along the external surface of the first build wall and the external surface of the second build wall, exterior of the powder bed and apart from the at least one object; and
 (f) repeating at least steps (b), (c), and (d) to form the at least one object between the outer build envelope and the inner build envelope, wherein the at least one build unit is moved in a radial direction during the manufacture of the at least one object.

2. The method of claim 1, wherein the at least one object is formed separate and apart from the first build wall and second build wall within the powder bed.

3. The method of claim 2, wherein the outer collector and the inner collector are attached to the at least one build unit via a support member, wherein the support member includes a pivot joint.

4. The method of claim 3, further comprising biasing the pivot joint to maintain the collector in contact with the outer surface of the build wall.

5. The method of claim 4, wherein the pivot joint is controlled with the movement of the at least one build unit.

6. The method of claim 1, wherein the outer collector and the inner collector are attached to a positioning mechanism via a support member.

7. The method of claim 1, wherein the at least one build unit comprises a powder delivery mechanism, a powder recoating mechanism, and an irradiation beam directing mechanism.

8. The method of claim 1, wherein the powder comprises a metallic powder material.

9. The method of claim 1, further comprising collecting excess powder falling from the outside of the build wall.

* * * * *